United States Patent [19]

Saka et al.

[11] Patent Number: 5,977,346
[45] Date of Patent: Nov. 2, 1999

[54] FATTY ACID ESTER OF CELLULOSE, CELLULOSE DIACETATE AND PROCESSES FOR THE PREPARATION THEREOF

[75] Inventors: Shiro Saka, Shiga; Hiroyuki Matsumura, Hyogo; Naoto Habu, Hyogo; Yoshiaki Kaino, Hyogo; Ryouta Iwata, Hyogo; Tanemi Asai, Hyogo; Syu Shimamoto, Hyogo, all of Japan

[73] Assignee: Daicel Chemical Industries, Ltd., Tokyo, Japan

[21] Appl. No.: 08/764,073

[22] Filed: Nov. 26, 1996

Related U.S. Application Data

[63] Continuation of application No. 08/126,781, Sep. 24, 1993, abandoned.

[30] Foreign Application Priority Data

| Sep. 24, 1992 | [JP] | Japan | 4-254799 |
| Sep. 24, 1992 | [JP] | Japan | 4-254800 |
| Jul. 16, 1993 | [JP] | Japan | 5-176866 |
| Jul. 26, 1993 | [JP] | Japan | 5-183999 |

[51] Int. Cl.⁶ .............. C08B 3/06; C08B 3/08; C08B 3/22; C08B 3/26
[52] U.S. Cl. .............. 536/63; 536/64; 536/65; 536/69; 536/76; 536/82; 536/83
[58] Field of Search .............. 536/64, 65, 69, 536/76, 82, 83, 63

[56] References Cited

U.S. PATENT DOCUMENTS

| 2,809,191 | 10/1957 | Sloan et al. | |
| 2,827,455 | 3/1958 | Wells et al. | |
| 3,767,642 | 10/1973 | Campbell et al. | |
| 3,846,403 | 11/1974 | Gibney et al. | |
| 3,870,703 | 3/1975 | Gibney et al. | |
| 4,306,060 | 12/1981 | Ikemoto | 536/69 |
| 4,439,605 | 3/1984 | Yabune et al. | 536/71 |
| 5,028,702 | 7/1991 | Matsumoto et al. | 536/65 |
| 5,036,900 | 8/1991 | Burley et al. | 162/9 |
| 5,047,180 | 9/1991 | Steiner et al. | 264/5 |
| 5,371,207 | 12/1994 | Zhuang | 536/63 |
| 5,608,050 | 3/1997 | Kuo et al. | 536/69 |

FOREIGN PATENT DOCUMENTS

62-501  1/1987  Japan.

OTHER PUBLICATIONS

Mokuzai Gakkaishi vol. 34, No. 4, pp. 346–353 (1988) "Characterization of Acetone–Insoluble Substances in Cellulose Acetate as Prepared by an Acetylation/Ripening Process from . . . ".

Abstracts of the 43rd Annual Meeting of the Japan Wood Research Society, p. 285, and English translation thereof.

Patent Abstracts of Japan, vol. 11, No. 167 (C–425), May 28, 1987 & JP–A–62 000 501 (Nakamura Hiroyuki) Jan. 6, 1987.

Chemical Abstracts, vol. 96, No. 1, Jan. 1982, Columbus, OH; abstract No. 8426w, p. 106, col. L; & SU–A–861 353 (Vladimir Chemical Plant) Sep. 7, 1981.

Chemical Abstract of Canadian Patent 321,228 Apr., 1932.

*Primary Examiner*—Jeffrey C. Mullis
*Attorney, Agent, or Firm*—Flynn, Thiel, Boutell & Tanis, P.C.

[57] ABSTRACT

A fatty acid ester of cellulose having excellent transparency, filterability and spinnability in spite of its high content of mannose and xylose, wherein the total molar content of mannose and xylose accounts for at least 7% of that of glucose, mannose and xylose, and the amount of filtration satisfies a specified requirement. Such a fatty acid ester of cellulose is prepared by using a pulp having a low α-cellulose content as a raw material and a fatty acid corresponding to the ester as a diluent and adding an organic solvent in an amount of at least 10% by weight based on the diluent in any step during the preparation. In the preparation of cellulose diacetate, which excellent filterability and transparency, by the acetic acid process, the cellulose diacetate obtained by aging is dissolved in a solvent which can dissolve it and the resulting cellulose diacetate is recovered.

21 Claims, No Drawings

FATTY ACID ESTER OF CELLULOSE, CELLULOSE DIACETATE AND PROCESSES FOR THE PREPARATION THEREOF

This application is a continuation of U.S. Ser. No. 08/126 781, filed Sep. 24, 1993 now abandoned.

BACKGROUND OF THE INVENTION

1. Field of the Invention

The present invention relates to a fatty acid ester of cellulose and a process for the preparation thereof. More particularly, the present invention relates to a fatty acid ester of cellulose having excellent transparency, filterability and spinnability, and a process for the preparation thereof from a low-grade dissolving pulp as the raw cellulose material.

Furthermore, the present invention relates to cellulose diacetate and a process for the preparation thereof, more particularly, cellulose diacetate which has excellent filterability and hue, and yields few insolubles when dissolved in a solvent and in which the particle size of glucomannan acetate contained in the sediment formed by centrifuging is very small, and a process for the preparation thereof from, for example, a low-grade dissolving wood pulp.

2. Description of the Related Art

Among cellulose derivatives, fatty acid esters of cellulose, particularly cellulose acetate hold an important position industrially by virtue of their wide fields of applications including fibers for clothes, cigarette filters, plastics, film, coating materials, etc.

Although wood pulps are mainly used as the raw material for preparing fatty acid esters of cellulose, a highly purified high-grade dissolving pulp is particularly useful. This is because when the conventional, common process for the preparation thereof is applied to a low-grade wood dissolving pulp, a large amount of insoluble matters in a solvent, i.e., so-called insoluble residues are formed to impair its spinnability and transparency as a plastic, remarkably, so that filtration is required to secure these qualities.

The standard process for the preparation of cellulose acetate, which is a representative fatty acid ester of cellulose, basically comprises (1) a pretreatment step of disaggregating and disintegrating a starting pulp having a relatively high α-cellulose content, spraying the resulting pulp with acetic acid and mixing, (2) an acetylation step of reacting the pretreated pulp obtained in (1) with a mixed acid comprising acetic anhydride, acetic acid and an acetylation catalyst (e.g., sulfuric acid), (3) an aging step, i.e., a hydrolysis step, of hydrolyzing the obtained cellulose acetate to a desired degree of acetylation, and (4) a post-treatment step of precipitating the hydrolyed cellulose acetate, recovering the precipitates and subjecting the precipitates to purification, stabilization and drying, successively.

Improvement techniques for the above standard process from various standpoints have been reported in order to enable the preparation of a high-quality cellulose ester from a low-grade dissolving pulp which is available at a low cost.

U.S. Pat. No. 3,767,642 (patented on Oct. 23, 1973; Assignee: CELANESE Corp.) discloses that cellulose acetate having excellent transparency, filterability and spinnability is prepared by disintegrating a wood dissolving pulp having an α-cellulose content of 92 to 93% in a dilute aqueous solution of acetic acid to obtain a slurry, subjecting the slurry to a so-called slurry pretreatment wherein the removal of liquid and replacement of the liquid by acetic acid are repeated alternately, acetylating the resulting pulp according to the process of the prior art, neutralizing the sulfuric acid catalyst contained in the reaction system, and subjecting the reaction mixture to saponification and aging at 125 to 170° C.

Further, U.S. Pat. No. 4,306,060 (patented on Dec. 15, 1981; Assignee: DAICEL CHEMICAL Ind., Ltd.) discloses a process for preparing cellulose acetate having excellent transparency, filterability and spinnability which comprises disintegrating a high-grade dissolving pulp having a high α-cellulose content by a common dry process, acetylating the resulting pulp in the presence of a small amount of sulfuric acid as the catalyst at high temperature to complete the acetylation in a short time, completely neutralizing the sulfuric acid catalyst contained in the system, and subjecting the reaction mixture to saponification at 110 to 120° C. Further, it is also disclosed that this process enables the utilization of a low-grade dissolving pulp having a low α-cellulose content.

The characteristic common to the above techniques is that the saponification is conducted at high temperature. Such high-temperature saponification promotes the destruction and/or deformation of a hemicellulose acetate which otherwise damages the characteristics of cellulose acetate, whereby the hemicellulose acetate is converted into a harmless substance.

Attempts are disclosed to solve the above problem with attention being paid to the phenomenon that a low-grade wood dissolving pulp sheet is generally difficult to disintegrate due to its high density, which leads to the poor dispersibility of the pulp in the reaction medium to result in the formation of an insoluble residue. More specifically, there is disclosed a process wherein a pulp sheet is softened by wet disintegration to remove the heat generated in the disintegration as latent heat of evaporation, by which the thermal degradation of the pulp is inhibited to yield cellulose as a raw material having a rich reactivity, thus enabling the acetylation of the cellulose free from gel formation due to unreacted matters and insufficient reaction. Further, there is disclosed a process which comprises conducting the dry disintegration of a starting pulp in an improved disintegrator to thereby depress the deterioration of the reactivity of the pulp during disintegration to such an extent as not to have any effect on the acetylation, thus enabling the acetylation of cellulose free from the gel formation due to unreacted matters and insufficient reaction.

However, when the above-mentioned techniques are applied to the acetylation of a pulp having an α-cellulose content as especially low as 85 to 93%, the effect is too insufficient to avoid the lowering in the filterability of the resulting cellulose acetate.

Meanwhile, cellulose acetate is one of the organic acid esters of cellulose, the use of which is spread over many fields including the materials for clothes, cigarette filter tips, plastics, films, coating materials, medicines, foods, cosmetics and building materials and the production of which is the highest among cellulose derivatives, thus being industrially important.

The so-called acetic acid process using acetic anhydride as an acetylating agent, acetic acid as a diluent and sulfuric acid as a catalyst is a representative one as the industrial process for the preparation of cellulose diacetate. This process comprises (1) an acetylation step of pretreating a starting pulp having a relatively high α-cellulose content as the raw material by disaggregation, disintegration and spraying with acetic acid to activate the starting pulp and thereafter treating the activated pulp with a mixed acid comprising acetic anhydride, acetic acid and sulfuric acid to give cellulose triacetate; (2) an aging step, i.e., the hydrolysis step, of hydrolyzing the obtained cellulose triacetate into cellulose diacetate having a desired degree of acetylation; and (3) a post-treatment step of separating the cellulose diacetate from the reaction mixture by precipitation, followed by purification, stabilization and drying. The term "cellulose diacetate" used in this specification refers to one having a degree of acetylation of 50 to 57%. Further, the term "degree of acetylation" refers to a value as determined and calculated according to the method stipulated in ASTM-D-871, i.e., a value obtained by calculating the acetyl group content of cellulose acetate as the amount of acetic acid.

The cellulose diacetate prepared by the above process is again dissolved in a solvent such as acetone, molded and thereafter used as a commercial product.

Improvement techniques have been proposed from various standpoints to prepare a high-quality cellulose diacetate from a low-grade wood dissolving pulp having a low $\alpha$-cellulose content through the above-mentioned essential steps.

Japanese Patent Publication-A No. 501/1987 (published on Jan. 6th, 1987) discloses that cellulose acetate having a very excellent hue can be prepared from a starting pulp having a low $\alpha$-cellulose content for the preparation of viscose and cellulose ether by preliminarily swelling the pulp with a solvent.

Further, U.S. Pat. No. 3,846,403 (patented on Nov. 5th, 1974; Assignee: CANADIAN CELLULOSE CO.) discloses that in the preparation of a cellulose ester, a cellulose ester having characteristics not inferior to those prepared from a purer cellulose source is obtained by reacting a pulp with an esterifying agent other than an objective one, i.e., a lower alkanoic acid, to form hemicellulose ester prior to the reaction with the objective lower alkanoic anhydride. According to this technique, a high-quality cellulose ester can be obtained even from a starting pulp having a hemicellulose content far higher than 5%, i.e., as high as 8%, 10% or even above.

However, the technique described in the above Japanese Patent Publication-A No. 501/1987 is one for improving the hue of the cellulose acetate prepared from a low-grade wood dissolving pulp, so that it is silent upon the effect of improving other physical properties. Further, the technique has a defect that little effect is attained when a pulp having an $\alpha$-cellulose content of 90% or below is used.

On the other hand, U.S. Pat. No. 3,846,403 discloses that even when the hemicellulose content of a starting pulp is 10% or above, the physical properties can be improved, and involves the description on the improvement in the filterability and the effect of reducing the weight of the insoluble residue with respect to cellulose triacetate, which is, however, different from the subject matter of the present invention, i.e., cellulose diacetate. Thus, it is unclear with respect to the properties of the cellulose diacetate.

Generally, a high-grade wood dissolving pulp having a high $\alpha$-cellulose content is used as the raw cellulose material. However, obtaining high-grade pulp in quantity will become difficult because of the saving of resources on the global scale and the environmental pollution by pulp factories, so that the changeover to a low-grade wood dissolving pulp is believed to be unavoidable.

When cellulose diacetate is prepared from a low-grade wood dissolving pulp by the process of the prior art, the obtained cellulose diacetate produces a large amount of insolubles when dissolved in a solvent, which causes various problems such as lowering in the transparency of the product, an increase in the yellowness and a remarkable lowering in the characteristics in the filtration prior to the spinning step. There is a correlation between the $\alpha$-cellulose content of a starting pulp and the properties of cellulose diacetate prepared from the pulp, so that when the adaptability to acetylation of a pulp is discussed only from the standpoint of chemical factors, the use of a starting pulp having an $\alpha$-cellulose content of 93% or below gives only a very poor cellulose diacetate which is practically unusable as a commercial product owing to a remarkable increase in the amount of insolubles in a solvent such as acetone.

Various studies have been made on the above insolubles and abundant literature thereon can be found. Further, it is pointed out that the hemicellulose contained in a starting pulp may participate in the formation of the insolubles [see, e.g., Ueda et al., J. Japan Wood Research Soc., 34(4), 346–353 (1988)].

In order to prepare cellulose diacetate containing few insoluble components, therefore, it is thought necessary to employ either the means (1) of using a highly-purified, high-grade wood dissolving pulp having a low hemicellulose content as the raw material or the means (2) of reducing or removing the insolubles in the cellulose diacetate prepared from a low-grade dissolving pulp.

The former means, i.e., the use of a high-grade wood dissolving pulp as the raw material is actually industrially employed. However, the purification of a pulp by the removal of hemicellulose therefrom not only involves a lowering in the yield in preparing pulp from wood as the raw material to result in an increase in the production cost, but also is thought to be undesirable from the standpoint of the effective utilization of resources on the global scale. Further, even the content of solvent insolubles in the cellulose acetate prepared from a high-purity pulp cannot be said to be low enough, but is expected to be further lowered for an improvement in the quality.

DISCLOSURE OF THE INVENTION

Summary of the Invention

The present inventors have recovered the insoluble residue which is present in the reaction mixture obtained by acetylating a low-grade wood dissolving pulp having a low $\alpha$-cellulose content in a large amount and have made extensive studies on the residue. As a result of the studies, they have ascertained that the insoluble residue is an association comprising cellulose triacetate and glucomannan triacetate. Furthermmore, they have ascertained that this insoluble residue maintains the form of wood pulp fiber though it is considerably swollen in the acetylation system.

On the basis of this information, the present inventors have studied the solubility of acetylated glucomannan contained in a low-grade wood dissolving pulp having a low $\alpha$-cellulose content in various solvents to find that the amount of the insoluble residue can be reduced in such a state that glucomannan acetate is not removed from the reaction solution but remains therein by conducting the acetylation in a system wherein part of the acetic acid used as the diluent for the acetylation is replaced by an organic solvent, by adding an organic solvent as the third component to the reaction system during the course of the reaction and thereafter continuing the reaction, or by adding an organic solvent as the third component to the system after the completion of the reaction, so that cellulose acetate having excellent filterability, transparency and spinnability can be prepared from a low-grade wood dissolving pulp having an $\alpha$-cellulose content far lower than that of the pulp which was conventionally used according to the prior art. Further, it has also been found that this process can be applied to the preparation of other fatty acid esters of cellulose. The present invention has been accomplished on the basis of these findings.

Thus, the first embodiment of the present invention provides a process for the preparation of a fatty acid ester of cellulose by using a pulp having a low α-cellulose content as the raw material and a fatty acid corresponding to the ester as a diluent, which comprises adding an organic solvent in an amount of at least 10% by weight based on the amount of the diluent in some preparation step during the preparation thereof.

Further, the second embodiment of the present invention provides a triester or diester of cellulose with a fatty acid, wherein the total molar content (as determined by the analysis of constituent saccharides) of mannose and xylose in the triester or diester accounts for at least 7%, preferably 7 to 30%, of that of glucose, mannose and xylose therein and the amount $P_2(g)$ of filtration achieved in the filtration under given conditions, which will be described below for a period of 40 minutes starting with 20 minutes after the initiation of the filtration, satisfies the following requirement (A) or (B):

(A) for the triester of cellulose with a fatty acid $P_2 > -0.14 \eta + 86$; and (B) for the diester of cellulose with a fatty acid $P_2 > -0.16 \eta + 40$, wherein η is the viscosity (centipoise, hereinafter referred to as "cP") of a 6% solution of the triester or diester in a prescribed solvent as determined by the method which will be described below.

The fatty acid ester of cellulose according to the present invention has excellent filterability, though it contains xylose and mannose in large amounts as determined by the analysis of constituent saccharides of the fatty acid ester.

The present inventors have extensively studied to prepare a high-quality cellulose diacetate from a low-grade wood dissolving pulp having a low α-cellulose content. As a result, they have found a cellulose diacetate having an extremely reduced amount of insolubles remaining when dissolved in a solvent such as acetone and having a very excellent filterability and transparency and which is characterized in that the particle size of the glucomannan acetate constituting the insolubles is extremely small, i.e., one which has a quality equivalent to that of cellulose diacetate prepared from a high-grade wood dissolving pulp, though it is prepared from a low-grade wood dissolving pulp. The present invention has been accomplished on the basis of this finding.

Thus, the third embodiment of the present invention provides a process for the preparation of cellulose diacetate comprising the steps of acetylating a starting pulp and aging the acetylated pulp, which comprises taking out cellulose diacetate treated in the aging step, dissolving the cellulose diacetate taken out in a solvent which can dissolve it and recovering the resulting cellulose diacetate, and cellulose diacetate having an excellent quality prepared by this process.

According to the present invention, the qualities of the cellulose diacetate such as filterability, transparency and so forth can be improved in such a way that hemicellulose, which exerts a great influence on the formation of insolubles, is not removed from the system but remains therein. This phenomenon is presumably because the acetone-insoluble substance undergoes a structural change to be solubilized in acetone when it is dissolved in a solvent and recovered again by, e.g., precipitation.

The process for the preparation according to the present invention not only can be employed for improving the quality of the cellulose diacetate prepared by the conventional industrial process, but also enables the preparation of cellulose diacetate having a satisfactory quality, even from a low-grade wood dissolving pulp which contains a large amount of hemicelluloses and could not give any cellulose diacetate having a satisfactory quality according to the prior art owing to the formation of the insolubles due to the hemicellulose.

Furthermore, the fourth embodiment of the present invention provides cellulose diacetate having various physical properties. Specially, cellulose diacetates represented by the followings (a) to (f) are cited.

(a) Cellulose diacetate which has a total molar fraction of xylose and mannose accounting for at least 3.3% of that of xylose, mannose and glucose as determined by the analysis of the constituent saccharides of the cellulose diacetate, not more than 0.2% of the amount of the sediment formed by centrifuging a 2 wt % solution of the cellulose diacetate in acetone at 8000 rpm at 15° C. for 30 minutes based on the whole quantity of the cellulose diacetate contained in the solution, and at least 1.1% of the amount of the sediment formed by centrifuging a 2 wt % solution of the cellulose diacetate in acetone at 50000 rpm at 15° C. for 3 hours based on the whole quantity of the cellulose diacetate contained in the solution.

Specially, one wherein the amount of the sediment formed by centrifuging a 2 wt % solution of the cellulose diacetate in acetone at 8000 rpm at 15° C. for 30 minutes accounts for not more than 15% based on the amount of the sediment formed by centrifuging a 2 wt % solution of the cellulose diacetate in acetone at 50000 rpm at 15° C. for 3 hours, is cited.

(b) Cellulose diacetate which has a total molar fraction of xylose and mannose accounting for at least 3.3% of that of xylose, mannose and glucose as determined by the analysis of the constituent saccharides of the cellulose diacetate, a KW value of not more than 200 as determined by a given method which will be described below, and at least 1.1% of the amount of the sediment formed by centrifuging a 2 wt % solution of the cellulose diacetate in acetone at 50000 rpm at 15° C. for 3 hours based on the whole quantity of the cellulose diacetate contained in the solution.

(c) Cellulose diacetate which has a total molar fraction of xylose and mannose accounting for at least 3.3% of that of xylose, mannose and glucose as determined by the analysis of the constituent saccharides of the cellulose diacetate, the total volume of the insolubles having a particle diameter ranging from 5.04 to 64.0 μm contained in 2 ml of a 1 wt % solution of the cellulose diacetate in acetone containing 4.9 wt % of an electrolyte of not more than $5 \times 10^{-6}$ cm$^3$ as determined by the electric resistance method, and at least 1.1% of the amount of the sediment formed by centrifuging a 2 wt % solution of the cellulose diacetate in acetone at 50000 rpm at 15° C. for 3 hours based on the whole quantity of the cellulose diacetate contained in the solution.

(d) Cellulose diacetate which has a total molar fraction of xylose and mannose accounting for at least 3.3% of that of xylose, mannose and glucose as determined by the analysis of the constituent saccharides of the cellulose diacetate, a haze value of not more than 20, and at least 1.1% of the amount of the sediment formed by centrifuging a 2 wt % solution of the cellulose diacetate in acetone at 50000 rpm at 15° C. for 3 hours based on the whole quantity of the sample contained in the solution.

(e) Cellulose diacetate which has a mannose content in the sediment accounting for at least 10% of the total molar fraction of xylose, mannose and glucose in the sediment as determined by an analysis of the constituent saccharides of the sediment formed by centrifuging a 2 wt % solution of the cellulose diacetate in acetone at 50000 rpm at 15° C. for 3 hours, and the mannose content in the sediment accounting for not more than 3% of the total molar fraction of xylose, mannose and glucose in the sediment as determined by the analysis of the constituent saccharides of the sediment formed by centrifuging a 2 wt % solution of the cellulose diacetate in acetone at 8000 rpm at 15° C. for 30 minutes.

(f) Cellulose diacetate satisfying the followings (A) to (H):

(A) the total molar fraction of xylose and mannose accounts for at least 3.3% of that of xylose, mannose and glucose as determined by an analysis of the constituent saccharides of the cellulose diacetate, (B) the amount of the sediment formed by centrifuging a 2 wt % solution of the cellulose diacetate in acetone at 8000 rpm at 15° C. for 30 minutes accounts for not more than 0.2% based on the whole quantity of the cellulose diacetate contained in the solution, (C) as determined by an analysis of the constituent saccharides of the sediment formed by centrifuging a 2 wt % solution of the cellulose diacetate in acetone at 8000 rpm at 15° C. for 30 minutes, the mannose content in the sediment accounts for not more than 3% of the total molar fraction of xylose, mannose and glucose in the sediment, (D) the amount of the sediment formed by centrifuging a 2 wt % solution of the cellulose diacetate in acetone at 50000 rpm at 15° C. for 3 hours accounts for at least 1.1% based on the total quantity of the cellulose diacetate contained in the solution, (E) the amount of the sediment formed by centrifuging a 2 wt % solution of the cellulose diacetate in acetone at 8000 rpm at 15° C. for 30 minutes accounts for not more than 15% based on the amount of the sediment formed by centrifuging a 2 wt % solution of the cellulose diacetate in acetone at 50000 rpm at 15° C. for 3 hours, (F) the KW value is not more than 200 as determined by a given method which will be described below, (G) the total volume of insolubles having a particle diameter ranging from 5.04 to 64.0 $\mu$m contained in 2 ml of a 1 wt % solution of the cellulose diacetate in acetone containing 4.9 wt % of an electrolyte is not more than $5 \times 10^{-6}$ cm$^3$ as determined by the electric resistance method, and (H) the haze value is not more than 20.

Further, each of these cellulose diacetates may be one wherein, as determined by the analysis of the constituent saccharides of the sediment formed by centrifuging a 2 wt % acetone solution at 50000 rpm at 15° C. for 3 hours, the mannose content accounts for at least 10% of the total molar fraction of xylose, mannose and glucose.

Though the process for the preparation of each of these cellulose diacetates is not particularly limited, it is preferable that the cellulose diacetate is produced by a process according to the third embodiment of the present invention because the cellulose diacetate can easily be produced from a starting low-grade wood dissolving pulp.

Further scope and applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The process according to the first embodiment of the present invention will now be described.

The preparation of cellulose acetate, specially cellulose triacetate or cellulose diacetate, will now be described as an example of the process according to the first embodiment of the present invention.

The wood dissolving pulp to be used as the raw cellulose material in the process for the preparation of cellulose acetate according to the present invention is a low-grade wood dissolving pulp having an α-cellulose content of 85 to 93% by weight. Such a pulp is generally available in sheet form and it is preferable that the sheet have a basis weight of 300 to 850 g/m$^2$, a density of 0.40 to 0.50 g/cm$^3$ and a bursting strength of 50 to 350 kPa, though the sheet to be used is not limited to those having such characteristics.

Although the pretreatment of the starting pulp prior to the reaction is not always necessary, it is a usual practice. For example, a pulp is treated in a disintegrator to obtain a fluffy pulp. This fluffy pulp is activated by pretreatment as follows: for example, 100 parts by weight of the fluffy pulp is sprayed with 20 to 100 parts by weight of acetic acid and the obtained mixture is stirred in a hermetically sealed container fitted with a stirrer at a temperature of 20 to 50° C. for 0.5 to 2 hours (pretreatment step).

Then, 200 to 400 parts by weight of acetic anhydride as an acetylating agent, 300 to 500 parts by weight of acetic acid and 0.5 to 5 parts by weight of an acidic catalyst are added to the resulting pulp, followed by mixing by stirring. The acetylation catalyst is not particularly limited but may be any one so far as it accelerates the acetylation. The catalyst includes sulfuric acid and perchloric acid, of which sulfuric acid is preferable. Although the order of the addition of these acids is not particularly limited, it is suitable that the catalyst is added in a state premixed with acetic acid or acetic anhydride, because decomposition occurs when the catalyst comes in contact with a pulp. The contents undergo heat buildup owing to reaction, so that the temperature of the contents is controlled so as to rise at a nearly constant ratio, by which the contents are brought finally to a temperature ranging from 50 to 85° C. in 20 to 60 minutes. The resulting contents are maintained at that temperature for 3 to 20 minutes to acetylate the cellulose, thus giving cellulose triacetate (primary cellulose acetate) (acetylation step).

Then, in order to prepare cellulose diacetate (secondary cellulose acetate), the above cellulose triacetate is subjected to hydrolysis (saponification or aging). More specifically, the acetylation catalyst contained in the reaction mixture of the acetylation is neutralized and thereafter steam is blown into the system at a pressure of 1 to 10 kg/cm$^2$ to bring the system to a temperature ranging from 125 to 170° C. The system is preferably maintained in this temperature range for 3 minutes to 6 hours, by which the acetyl groups of the cellulose triacetate are hydrolyzed to give cellulose diacetate having a desired degree of acetylation (aging or hydrolysis step).

After the completion of the aging or hydrolysis step, the reaction mixture is introduced into a dilute aqueous solution of acetic acid to form precipitates, which are recovered, washed, purified and dried (post-treatment step).

According to the present invention, an organic solvent may be added in any step of the above pretreatment, acetylation, aging and post-treatment. Alternatively, it may be added in a plurality of steps thereof. The amount of the organic solvent to be added is at least 10% by weight, preferably 10 to 90% by weight, still more preferably 30 to 70% by weight, based on the amount of the diluent such as acetic acid.

The above-mentioned process is one conducted according to the acetic acid method which is a typical process for the preparation of cellulose acetate, and can be variously modified.

As described above, one of the characteristics of the process according to the present invention is to use a fatty acid corresponding to the objective cellulose ester as a diluent for the reaction.

The other characteristic of the process according to the present invention is to add an organic solvent as a third component in any step, for example, one of the pretreatment, reaction and recovery by precipitation according to the acetic acid process. The specific method of the addition of the organic solvent is not particularly limited. Although the addition of the organic solvent may be conducted in the pretreatment-activation step in the acetic acid process, the addition in this step hinders the swelling of pulp fibers, delays the acetylation, or makes it difficult to dissolve cellulose acetate having a low degree of replacement as formed progressively by the acetylation in the reaction system efficiently. Accordingly, it is preferable to conduct the addition of the organic solvent as a third component in the acetylation step, still preferably in a step wherein the acetylation of a wood dissolving pulp proceeds considerably. Then, the acetylation is further continued to form a triester of cellulose with a fatty acid. According to such a process, the insoluble matter comprising a fatty acid ester of cellulose having a high degree of replacement and a fatty acid ester of glucomannan can be effectively dissociated and dissolved. Alternatively, the organic solvent may be added in the aging or post-treatment step.

The organic solvent to be used in the present invention as a third component may be any one, so far as it does not hinder the objective esterification. The organic solvent is preferably one exhibiting a high dissolving power for glucomannan acetate, and specifically is an aprotic compound which has one or two dipolar groups such as a halogen-carbon linkage, a carbonyl group, a nitro group, a sulfur-oxygen linkage, an ether linkage and so on and a melting point of 50° C. or below and is compatible with the fatty acid used as the diluent at an arbitrary ratio. Preferred examples of the organic solvent to be used in the present invention include halogenated hydrocarbons such as dichloromethane (methylene chloride), chloroform, carbon tetrachloride, 1,1,2,2-tetrachloroethane, trichloroethylene and dichloroacetic acid; a solvent of a nitro compound such as nitromethane, nitroethane and 1-nitropropane; and ethyl cellosolve acetate and cyclohexanone.

When the organic solvent added to the system causes troubles, for example, when the system suffers from phase separation owing to the addition of water in the neutralization, aging or precipitation step, part or the whole of the organic solvent may be removed from the reaction system in a suitable step by heating or evacuation, when the melting point of the organic solvent is lower than that of the diluent. Further, when the organic solvent is added after the completion of the reaction, it may be removed by washing, heating, evacuation or the like.

The fatty acid ester of cellulose prepared by the process of the present invention includes cellulose propionate, cellulose butyrate, cellulose acetate propionate and cellulose acetate butyrate in addition to the above-mentioned cellulose acetate. These esters can be each prepared in the same manner as described above for the preparation of cellulose acetate except that one or more corresponding fatty acids are used instead of the acetic acid at a desired ratio.

The triester or diester of cellulose with a fatty acid according to the second embodiment of the present invention will now be described.

The method and conditions of the analysis of constituent saccharides according to the second embodiment of the present invention are as follows:

(1) Method

The analysis of constituent saccharides is conducted according to the alditol acetate method [see Borchadt, L. G.; Piper, C. V.: Tappi, 53, 257–260 (1970)].

(2) Conditions for Measurement gas chromatograph: Shimadzu GC-7A Gas Chromatograph column: 10% Silar 10C column (2 m)

injection temp.: 250° C.

column temp.: 230° C.

carrier gas: helium (40 ml/min)

Each content was determined by averaging the values obtained by conducting the analysis thrice. The fatty acid ester of cellulose according to the present invention is one wherein the total molar content of mannose and xylose in the ester accounts for at least 7% of that of glucose, mannose and xylose therein.

The amount of filtration and the viscosity of 6% solution are determined by the following methods:

(i) Amount of Filtration

A solution of cellulose ester prepared by dissolving a cellulose ester, e.g., cellulose acetate, in a given solvent in a given concentration is filtered through a given filter cloth (diameter: 15 mm, filtration area: 1.77 $cm^2$) at a given temperature under a constant pressure to determine the amount of filtration. The amount of filtration achieved during the filtration for a period of 20 minutes after the initiation of the filtration is represented by $P_1$ (g), and that achieved for a period of 40 minutes (from 20 minutes after the initiation of the filtration to 60 minutes after the initiation of the filtration) is represented by $P_2$ (g). The triester of cellulose with a fatty acid and the diester of cellulose with a fatty acid are different in solubility in a solvent, so that the conditions to be employed for the triester are different from those for the diester. The conditions for each ester are as specified in Table 1.

TABLE 1

| | Solvent | Concn. | Temp. | Filter cloth | Pressure |
|---|---|---|---|---|---|
| triester of cellulose with a fatty acid | methylene chloride/ methanol (91:9) (wt. ratio) | 16% | 25° C. | 3 sheets of shirting cloth (S618) | 3 $kg/cm^2$ |

TABLE 1-continued

| | Solvent | Concn. | Temp. | Filter cloth | Pressure |
|---|---|---|---|---|---|
| diester of cellulose with a fatty acid | 95% aq. solution of acetone | 20% | 30° C. | 2 sheets of shirting cloth (S618) and 1 sheet of single-raised flannel (No. 9 A) inserted between them | 2 kg/cm2 |

The triester of cellulose with a fatty acid of the present invention has the amount $P_2$ (g) of filtration satisfying the above described requirement (A), and the diester of cellulose with a fatty acid of the present invention has the amount $P_2$ (g) of filtration satisfying the above described requirement (B).

(ii) Viscosity of 6% Solution

A triester of cellulose with a fatty acid or a diester of cellulose with a fatty acid is completely dissolved in the same solvent as that used in the determination of the amount of filtration in a concentration of 6%. The obtained solution is examined for falling time ($t_1$, sec) by the use of an Ostwald viscometer at 25±0.1° C. Further, a standard liquid, of which the absolute viscosity $\eta_2$ (cP) and density $D_2$ (g/ml) at 25° C. is known, is also examined for falling time ($t_2$, sec) by the use of the same viscometer. The viscosity $\eta_1$ (cP) of the sample solution is calculated by the following formula:

$$\eta_1 = [\eta_2/(D_2 \times t_2)] \times D_1 \times t_1$$

wherein $\eta_2/(D_2 \times t_2)$ is a conversion factor inherent in the viscometer used; $D_1$ is the density of the sample solution to be examined and is 1.235 g/ml with respect to the triester of cellulose with a fatty acid and 0.823 g/ml with respect to the diester of cellulose with a fatty acid in the calculation.

The $P_2$ value determined by the above method increases as the clogging of the filter with particulate impurities decrease, and serves as an indication of the filterability of cellulose ester. At the same time, the $P_2$ value is affected by the viscosity of the sample solution, so that a sample solution having a lower viscosity gives a larger $P_2$ value. The fatty acid ester of cellulose of the present invention having such viscosity and amount of filtration $P_2$ as to satisfy the above requirements (A) or (B) is a product having an excellent filterability and has, needless to say, a suitable viscosity, though it contains xylose and mannose in large amounts as determined by the analysis of constituent saccharides.

The process for the preparation of cellulose diacetate according to the third embodiment of the present invention will now be briefly described.

A pulp as the raw cellulose material is disintegrated and sprayed with acetic acid, and then the obtained mixture is stirred to conduct a pretreatment. The pretreated pulp is treated with a mixed acid comprising acetic anhydride, acetic acid and an acidic catalyst to give cellulose triacetate (acetylation step). The amounts of the acetic anhydride, acetic acid and acidic catalyst to be used in this step and the reaction temperature may be the same as those employed in the conventional processes. The obtained cellulose triacetate is partially hydrolyzed into cellulose diacetate having a desired degree of acetylation (aging or hydrolysis step). The cellulose diacetate obtained by the aging is dissolved in a solvent which can dissolve it and thereafter the resulting cellulose diacetate is recovered again and dried by conventional means.

The α-cellulose content of the starting pulp to be used in the present invention may be any one as long as it is 85% or above and the process of the present invention is effective in improving the cellulose diacetate prepared from such a pulp in transparency, filterability and so on. The effects of the present invention are particularly remarkable when a low-grade wood dissolving pulp having an α-cellulose content of about 85 to 93% and containing a large amount of hemicellulose is used, though the starting pulp to be used is not limited to such low-grade ones.

The solvent to be used in dissolving the cellulose diacetate obtained by the aging is not particularly limited but may be any one having a high dissolving power for the cellulose diacetate. The effects of the present invention are particularly remarkable, when a chlorinated hydrocarbon such as methylene chloride (dichloromethane), ethylene chloride, chloroform or 1,1,2,2-tetrachloroethane or a mixture thereof with a polar solvent such as methanol, ethanol or acetic acid is used. The solvent is used in an amount enough to dissolve the cellulose diacetate. Further, the conditions (such as temperature and concentration) of the dissolution and recovery are not particularly limited.

The cellulose diacetate prepared by the process according to the third embodiment of the present invention has qualities including extremely reduced amounts of insolubles when dissolved in a solvent such as acetone, extremely small particle size of glucomannan acetate constituting the insolubles, very excellent filterability and transparency, and equivalent to those of cellulose diacetate prepared from a high-grade wood dissolving pulp, though a low-grade wood dissolving pulp is used as the raw material.

The cellulose diacetate according to the fourth embodiment of the present invention will now be described.

The cellulose diacetates according to the forth embodiment of the present invention are characterized by having various physical properties described above. The various physical values of the cellulose diacetate are determined as follows.

(i) Analysis of Constituent Saccharides:

This analysis is conducted according to the alditol acetate method which comprises the step of hydrolyzing the cellulose sample, the step of reducing the resulting sample with sodium borohydride and the step of acetylating the reduced sample in an acetic anhydride/pyridine system, and the proportions of the constituent saccharides are calculated based on the results of gas chromatography [see L. G. Borchardt and C. V. Piper, Tappi, 53, 257–280 (1970)].

The conditions of the gas chromatography are as follows:
gas chromatograph: Shimadzu GC-7A gas chromatograph
column: 10% Silar 10C (2 m)
injection temp.: 250° C.
column temp.: 230° C.
carrier gas: helium (50 ml/min)
implantation: 5 μl (ii) Amount of Sediment:

The solvent to be used for dissolving the cellulose diacetate in the determination of the amount of sediment formed by centrifuging is acetone which has a high dissolving power for the cellulose diacetate. In the determination of the amount of the sediment by centrifugation at 15° C., the amount of the sediment is determined by separating settling components under each centrifuging condition, centrifuging the obtained sediment again with the same solvent under the same condition to wash the sediment and measuring the amount of the washed sediment.

(iii) KW:

A solution prepared by dissolving cellulose diacetate in a 95% aqueous solution of acetone in a concentration of 20% is filtered through a given filter cloth (diameter: 15 mm, area of filtration: 1.77 cm$^2$) at 30° C. to determine the amount of the filtrate passing through the cloth under a constant pressure (2 kg/cm$^2$). The degree of filtration (KW) is calculated by the following formula:

$$KW=[(2-(P_2/P_1))/(P_1+P_2)] \times 10^4$$

wherein $P_1$ is the amount (ml) of the filtrate recovered for a period of 20 minutes after the initiation of the filtration, and $P_2$ is the amount (ml) of the filtrate recovered for a period of 40 minutes ranging from 20 minutes after the initiation of the filtration to 60 minutes after the initiation of the filtration.

Since the KW value shows the content of insolubles in a solution of cellulose diacetate sample, it serves as an indication of the filterability. According to the above formula, the smaller KW value means the lower insoluble content in the solution and the better filterability thereof.

(iv) Total Volume of Insolubles:

The total volume of insolubles contained in a dilute solution of the sample is calculated by determining the particle size distribution of the insolubles by the electric resistance method. The electric resistance method is one which comprises making particles dispersed in an electrolytic solution pass through a small hole to which a constant current is applied together with the electrolytic solution being under suction and measuring a change in the electric resistance of the small hole occurring in passing the particles through the hole. More particularly, the process is one which utilizes the phenomenon that when particles pass through a small hole, the electrolytic solution of a volume corresponding to that of each particle is repelled and the electric resistance is increased in proportion to the amount of the repelled electrolytic solution and which comprises detecting a change in the electric resistance as a pulse to thereby determine the number and volume of the particles passing through the hole.

In the present invention, the concentration of the dilute solution of a sample is adjusted to 1% by weight, and the total volume of the insolubles having a particle diameter ranging from 5.04 to 64.0 μm contained in 2 ml of the dilute solution is determined by the use of a 4.9% acetone solution of an electrolyte as the solution for the measurement according to the above method.

(v) Haze:

The haze value is determined by the method in which a sample solution is irradiated with a light to determine the intensity of the irregularly reflected light. The lower the haze value means the better the sample is in transparency.

The fatty acid ester of cellulose according to the first and second embodiment of the present invention has excellent transparency, filterability and spinnability which could not be attained in the prior art, though it is prepared from a low-grade wood dissolving pulp having a low α-cellulose content. Thus, the present invention enables the high-level utilization of a low-grade wood dissolving pulp which was impossible according to the prior art. Further, the process according to the first embodiment of the present invention can be carried out without any drastic change in the process for the preparation of a fatty acid ester of cellulose according to the prior art, thus being economically advantageous.

According to the third embodiment of the present invention, cellulose diacetate having excellent filterability and transparency can be prepared in such a way that hemicellulose in the cellulose diacetate is not removed from the system but remains therein.

Further, the quality of the cellulose diacetate according to the third or fourth embodiments of the present invention is equivalent or superior to that of the cellulose diacetate prepared from a high-grade wood dissolving pulp as the raw material even when a low-grade wood dissolving pulp is used as the raw material. Thus, the present invention is extremely valuable with the standpoint that it enables the utilization of a low-grade wood dissolving pulp which has been unusable in the prior art.

EXAMPLES

The present invention will now be described in more detail with reference to the following Examples which should not be considered to limit the scope of the present invention. Unless otherwise stated, all parts and percentages in the Examples are by weight. Examples A-1 to A-10 and Comparative Example A-1

A dissolving pulp (α-cellulose content: 87.5%) prepared by the sulfite process was disintegrated with water in a household mixer and, after replacement of the water by acetone, dried to give a pulp having a water content of 5%. The resulting pulp was thrown into a pretreatment machine, where 100 parts of acetic acid was uniformly sprayed ón 100 parts of the pulp having a water content of 5%, followed by mixing for 30 minutes at 40° C. to pretreat and activate the pulp.

Separately, a mixture comprising 250 parts of acetic anhydride, 375 parts of acetic acid and 1.0 part of sulfuric acid was prepared, cooled to 12° C. and placed in a kneader acetylator. The pretreated and activated pulp prepared above was thrown into the acetylator, followed by mixing by stirring.

The contents of the acetylator underwent heat buildup due to the reaction of acetic anhydride with the water entrained by the pulp and that of acetic anhydride with the cellulose, so that the temperature of the contents was controlled by external cooling so as to rise from about 16° C. (initial) to 77° C. in 60 minutes. 125 parts of an organic solvent (see Table A-1) was added into the machine and the resulting mixture was further maintained at 77° C. for 12 minutes to conduct acetylation.

The obtained reaction mixture was centrifuged (at 7000 rpm for 30 minutes) to recover insolubles and the insoluble residue content of the obtained cellulose triacetate was determined. The degree of acetylation of the cellulose triacetate and that of the insoluble residue were both about 61%. The insoluble residue content of the product prepared in each acetylation is given in Table A-1. In Comparative Example A-1, no organic solvent was added. As understood from the insoluble residue content given in Table A-1, the filterability of the cellulose triacetate can be improved by the addition of an organic solvent to give a cellulose triacetate product having an excellent transparency.

TABLE A-1

| | Comp. Ex. | Ex. | | | | | | | | | |
|---|---|---|---|---|---|---|---|---|---|---|---|
| | A-1 | A-1 | A-2 | A-3 | A-4 | A-5 | A-6 | A-7 | A-8 | A-9 | A-10 |
| org. solvent | none | methylene chloride | chloroform | carbon tetrachoride | TCE | dichloro- acetic acid | nitro- methane | nitro- ethane | 1-nitro- propane | ECA | cyclo- hexanone |
| degree of acetyln. (%) | 61.2 | 60.8 | 61.2 | 61.0 | 60.5 | 61.1 | 61.0 | 60.6 | 61.0 | 60.7 | 60.9 |
| insol. residue content (%) | 13.0 | 4.0 | 5.6 | 6.0 | 4.5 | 0.8 | 0.6 | 3.0 | 7.1 | 6.8 | 7.5 |

TCE: tetrachloroethane (the same applies hereinafter)
ECA: ethyl cellosolve acetate (the same applies hereinafter)

The total molar amounts of mannose and xylose as determined by the analyses of constituent saccharides, the amounts ($P_2$) of filtration and the viscosities ($\eta$) of a 6% solution with respect to the cellulose triacetates prepared in Examples A-1, A-2, A-5 and A-6 and Comparative Example A-1 are given in Table A-2. The cellulose triacetates prepared in Examples A-1, A-2, A-5 and A-6 were products satisfying the requirement: $P_2 > -0.14 \eta + 86$.

TABLE A-2

| | Comp. Ex. | Example | | | |
|---|---|---|---|---|---|
| | A-1 | A-1 | A-2 | A-5 | A-6 |
| mannose + xylose (mole %) | 9.2 | 9.3 | 9.1 | 8.9 | 8.8 |
| $P_2$ (g) | 34 | 48 | 45 | 49 | 48 |
| $\eta$ (cP) | 340 | 320 | 325 | 335 | 332 |

Examples A-11 to A-20 and Comparative Example A-2

A dissolving pulp (α-cellulose content: 87.5%) prepared by the sulfite process was disintegrated by the use of an attrition mill. The fluffy and disintegrated pulp was dried to a water content of 5%. The resulting pulp was thrown into a pretreatment machine, where 100 parts of acetic acid was uniformly sprayed on 100 parts of the pulp having a water content of 5%, followed by mixing at 40° C. for 30 minutes to pretreat and activate the pulp. Separately, a mixture comprising 250 parts of acetic anhydride, 375 parts of acetic acid and 1.0 part of sulfuric acid was prepared, cooled to 12° C. and placed in a kneader acetylator. The pretreated and activated pulp prepared above was thrown into the acetylator, followed by mixing by stirring.

The contents of the acetylator underwent heat buildup due to the reaction of acetic anhydride with the water entrained by the pulp and that of acetic anhydride with the cellulose, so that the temperature of the contents was controlled by external cooling so as to rise from about 16° C. (initial) to 77° C. in 60 minutes. 125 parts of an organic solvent (see Table A-3) was added into the acetylator and the resulting mixture was further maintained at 77° C. for 12 minutes to conduct acetylation. In Comparative Example A-2, no organic solvent was added.

Then, the organic solvent was removed from the reaction mixture by utilizing the heat of reaction. 10 parts of a 20% aqueous solution of magnesium acetate was added to the resulting system, by which the sulfuric acid contained in the system was completely neutralized and the system was brought to a state containing excessive magnesium acetate. The completely neutralized reaction mixture was transferred into an autoclave and steam at a gauge pressure of 5 kg/cm$^2$ was blown into the autoclave in a hermetically sealed state to raise the temperature of the contents of the autoclave to 150° C. in about 60 minutes. The contents were maintained at 150° C. for 50 minutes and gradually flushed into the open air to lower the temperature thereof to 100° C. A dilute aqueous solution of acetic acid was added to the reaction mixture under vigorous stirring to separate flaky cellulose diacetate, which was recovered, fully washed with water and dried.

The degree of acetylation of the flaky cellulose diacetate thus obtained was about 55% and the viscosity and amount of filtration thereof are as given in Table A-3. As is apparent from these results, the obtained cellulose diacetate was a product having excellent filterability and spinnability.

Further, the total molar content of mannose and xylose in the cellulose diacetates prepared in Examples A-11, A-12, A-15 and A-16 and Comparative Example A-2 were 7.5, 7.2, 7.0, 7.1 and 7.3%, respectively, as determined by the analysis of constituent saccharides, and the amounts of filtration of the cellulose diacetates are as given in Table A-3. The cellulose diacetates prepared in Examples A-11, A-12, A-15 and A-16 are products satisfying the requirement: $P_2 > -0.16 \eta + 40$.

TABLE A-3

| | Comp. Ex. | Ex. | | | | | | | | | |
|---|---|---|---|---|---|---|---|---|---|---|---|
| | A-2 | A-11 | A-12 | A-13 | A-14 | A-15 | A-16 | A-17 | A-18 | A-19 | A-20 |
| org. solvent | none | methylene choride | chloroform | carbon tetra- choride | TCE | dichloro- acetic acid | nitro- methane | nitro- ethane | 1-nitro- propane | ECA | cyclo- hexanone |
| degree of acetyln. (%) | 54.1 | 55.4 | 55.0 | 54.8 | 54.5 | 55.0 | 54.3 | 54.8 | 5S.2 | 55.1 | 54.9 |

TABLE A-3-continued

| | Comp. Ex. | Ex. | | | | | | | | | |
|---|---|---|---|---|---|---|---|---|---|---|---|
| | A-2 | A-11 | A-12 | A-13 | A-14 | A-15 | A-16 | A-17 | A-18 | A-19 | A-20 |
| η (cP) | 130 | 95 | 98 | 100 | 93 | 102 | 100 | 92 | 95 | 99 | 102 |
| $P_2$ (g) | 2.1 | 34.5 | 30.2 | 27.9 | 32.4 | 35.0 | 35.2 | 27.5 | 26.5 | 28.0 | 26.7 |

The degree of acetylation of each cellulose acetate was determined by the method stipulated by ASTM D-871 (1970).

Example B-1

A soft wood sulfite dissolving pulp (α-cellulose content: 87.5%) was disintegrated with water by the use of a household mixer and, after the replacement of the water by acetone, dried to give a fluffy pulp. The water content of the fluffy pulp was adjusted to 5%. 500 parts of acetic acid was uniformly sprayed on 100 parts of the resulting fluffy pulp, followed by mixing at 60° C. for 2 hours to effect a pretreatment. The pretreated pulp was thrown into a mixture of 250 parts of acetic anhydride with 4 parts of sulfuric acid which had preliminarily been prepared in a kneader and cooled to 12° C., followed by agitation.

The contents of the kneader underwent heat buildup due to the reaction of acetic anhydride with water entrained by the pulp and that of acetic anhydride with cellulose. Therefore, the temperature of the contents was controlled by external cooling or heating so as to increase from about 16° C. (initial) to 77° C. in 60 minutes, and then the contents were maintained at 77° C. for 12 minutes to conduct acetylation.

Then, 10 parts of a 20% aqueous solution of magnesium acetate was added to the above reaction mixture, by which the sulfuric acid was neutralized and the system was brought to a state containing excessive magnesium acetate. The reaction mixture thus neutralized was transferred to an autoclave. Steam of a gauge pressure of 5 kg/cm² was blown into the autoclave in a hermetically sealed state under stirring to raise the temperature to 150° C. in about 60 minutes. The contents were maintained at 150° C. for 50 minutes and thereafter gradually flushed into the open air to lower the temperature of the reaction mixture to 100° C.

A dilute aqueous solution of acetic acid was added to the reaction mixture under vigorous stirring to give flaky cellulose diacetate, which was fully washed and dried. The degree of acetylation of the cellulose diacetate obtained was 56.3% and the degree of polymerization thereof was 178.

The flaky cellulose diacetate prepared by the above process was dissolved in a methylene chloride/methanol (9:1, by weight) mixture in a concentration of 2% and the obtained solution was concentrated in a vacuum. Methanol was added to the concentrated solution to form precipitates, which were recovered and fully dried. The cellulose diacetate thus prepared had a very good KW value of as low as 86.

The filterability of the cellulose diacetate was determined by the following method. A 20% solution of the cellulose diacetate in a 95% aqueous solution of acetone was filtered through a given filter cloth, i.e., 2 sheets of shirting cloth (S618) and 1 sheet of single-raised flannel (No. 9 A) inserted between them, at 30° C. to determine the amount of the filtrate passing through the cloth under a constant pressure, i.e., 2 kg/cm². The KW value, which serves as an indication of the filterability, was calculated by the following formula and the smaller KW value means the better filterability:

$$KW=[(2-(P_2/P_1))/(P_1+P_2)]\times 10^4$$

wherein $P_1$: the amount (ml) of the filtrate recovered for a period of 20 minutes after the initiation of the filtration.

$P_2$: the amount (ml) of the filtrate recovered for a period of 40 minutes of from 20 minutes after the initiation of the filtration until 60 minutes after the initiation of the filtration.

Example B-2

Cellulose diacetate prepared by acetylation and aging, i.e., hydrolysis, in the same manner as that of Example B-1 was dissolved in a chloroform/methanol (9:1, by weight) mixture in a concentration of 2% and the resulting cellulose diacetate was recovered in the same manner as that of Example B-1. The KW value of the cellulose diacetate thus recovered was determined to be a good one of as low as 115.

Comparative Example B-1

Cellulose diacetate prepared by acetylation and aging in the same manner as that of Example B-1 was examined as such for filterability without being dissolved in any chloroform/methanol mixture. The KW value thereof was as high as 601, which means that this cellulose diacetate was poor in filterability.

Example B-3

Cellulose diacetate was prepared from a soft wood sulfite dissolving pulp (α-cellulose content: 91%) in the same manner as that of the Example B-1 and dissolved in a methylene chloride/methanol (9:1, by weight) mixture in a concentration of 2%. The resulting cellulose diacetate was recovered in the same manner as that of Example B-1 and examined for filterability. The recovered cellulose diacetate had a very good KW value of as low as 68.

Example B-4

Cellulose diacetate was prepared by acetylation and aging in the same manner as that of Example B-3 and dissolved in an acetic acid/water (65:35, by weight) mixture and then the resulting cellulose diacetate was recovered in the same manner as that of Example B-1. The KW value of the recovered cellulose diacetate was examined. As a result, the KW value was 188.

Comparative Example B-2

Cellulose diacetate was prepared in the same manner as that of Example B-3 and examined as such for filterability without being dissolved in any solvent after the aging. The KW value was 251.

Further, Examples with respect to the cellulose diacetate of the present invention will now be described. The analysis of constituent saccharides, the amount of sediment, the KW, the total volume of insolubles and the haze were measured according to the methods (i) to (v) described above.

Examples B-5 and B-6

A soft wood sulfite dissolving pulp (α-cellulose content: 87.5%) was disintegrated in water and, after the replacement of the water with acetone, dried to give a fluffy pulp. The water content of the fluffy pulp was adjusted to 5.0%. 500 parts of acetic acid was uniformly sprayed on 100 parts of the resulting fluffy pulp, followed by mixing at 60° C. for 2 hours to effect a pretreatment and activation. The pretreated and activated pulp was thrown into a mixture comprising 250 parts of acetic anhydride, 375 parts of acetic acid and 4 parts of sulfuric acid which had been prepared in a kneader acetylator and cooled to 12° C., followed by agitation. The contents of the kneader acetylator underwent heat buildup due to the reaction of acetic anhydride with water entrained by the pulp and that of acetic anhydride with cellulose. Therefore, the temperature of the contents was controlled by external cooling so as to rise from about 16° C. (initial) to 77° C. in 60 minutes, and then the contents were maintained at 77° C. for 12 minutes to conduct acetylation.

Then, 10 parts of a 20% aqueous solution of magnesium acetate was added to the above reaction mixture, by which the sulfuric acid was neutralized and the system was brought to a state containing excessive magnesium acetate. The reaction mixture thus neutralized was transferred to an autoclave, steam at a gauge pressure of 5 kg/cm$^3$ was blown into the autoclave in a hermetically sealed state under stirring to raise the temperature of the contents to 150° C. in about 60 minutes. Then, the contents were maintained at 150° C. for 50 minutes and thereafter gradually flushed into the open air to lower the temperature of the reaction mixture to 100° C. A dilute aqueous solution of acetic acid was added to the reaction mixture under vigorous stirring to give flaky cellulose diacetate, which was recovered, thoroughly washed and dried.

The flaky cellulose diacetate prepared by the above process was dissolved in a dichloromethane/methanol (9:1, by weight) mixture in a concentration of 2% and the obtained solution was concentrated and evaporated to dryness in a vacuum to give a solvent-treated sample.

From the same starting pulp, cellulose diacetate having the degree of acetylation and the degree of polymerization which will be described in the column of Example B-6 in Table B-1 was obtained.

The degrees of acetylation, the degrees of polymerization, the results of the analysis of the constituent saccharides and so on with respect to the solvent-treated samples obtained are given in Table B-1. In the Table, the amount of sediment at 8K means the amount of sediment which is obtained by conducting centrifugation of a 2% solution of the sample in acetone at 8000 rpm at 15° C. for 30 minutes, and the 50K means the amount of sediment which is obtained by conducting centrifugation of a 2% solution of the sample in acetone at 50000 rpm at 15° C. for 3 hours (the same as hereinafter).

Comparative Examples B-3 to B-5

Various cellulose diacetates were prepared from a soft wood sulfite dissolving pulp (α-cellulose content: 87.5%) through acetylation and aging, i.e., hydrolysis, in a similar manner to that of Example B-5 except that the reaction conditions were varied. The treatment with the use of the dichloromethane/methanol mixture was not conducted.

The degrees of acetylation, the degrees of polymerization, the results of the analyses of the constituent saccharides and so on of the cellulose diacetates obtained are given in Table B-1.

TABLE B-1

|  |  | Ex. | | Comp. Ex. | | |
| --- | --- | --- | --- | --- | --- | --- |
|  |  | B-5 | B-6 | B-3 | B-4 | B-5 |
| Deg. of acetylation (%) |  | 54.98 | 56.69 | 55.90 | 55.80 | 54.98 |
| Deg. of polymn. |  | 178.8 | 186.9 | 165.8 | 177.0 | 178.8 |
| Const. saccharides | Xyl | 0.8 | 1.3 | 1.4 | 1.3 | 0.9 |
| of cellulose diacetate | Man | 2.5 | 5.0 | 5.2 | 3.3 | 2.6 |
| (mol %) | Glc | 96.7 | 93.8 | 93.4 | 95.4 | 96.5 |
| Amt. of sediment at 8K (%) |  | 0.16 | 0.12 | 0.69 | 0.70 | 0.37 |
| Amt. of sediment at 50K (%) |  | 1.10 | 2.40 | 2.60 | 2.13 | 1.23 |
| Const. saccharides | Xyl | 4.5 | 3.7 | 3.9 | 4.0 | 5.6 |
| of sediment at 50K | Man | 11.1 | 16.5 | 17.3 | 17.5 | 9.2 |
| (mol %) | Glc | 84.4 | 79.8 | 78.8 | 78.5 | 85.2 |
| Amt. of sediment at 8K/Amt. of sediment at 50K (%) |  | 14.5 | 5.0 | 26.5 | 32.7 | 30.1 |

Note)

Each of the abbreviations with respect to the constituent saccharides is meant as follows (the same as the Tables hereinafter).

Xyl: xylose

Man: mannose

Glc: glucose

Examples B-7 to B-9

A flaky cellulose diacetate was prepared from a soft wood sulfite dissolving pulp (α-cellulose content: 87.5%) through acetylation and aging in a similar manner to that of Example B-5 and dissolved in a dichloromethane/methanol (9:1, by weight) mixture in a concentration of 2%. Then, the obtained solution was concentrated and evaporated to dryness in a vacuum to give a solvent-treated sample.

From the same starting pulp, cellulose diacetates having the degree of acetylation and the degree of polymerization which will be described in the column of Example 8 or 9 in Table B-2 were obtained.

The degrees of acetylation, the degrees of polymerization, the results of the analyses of the constituent saccharides and so on with respect to the cellulose diacetates obtained are given in Table B-2.

Comparative Examples B-6 to B-8

Cellulose diacetate was prepared from a soft wood sulfite dissolving pulp (α-cellulose content: 87.5%) through acetylation and aging in a similar manner to that of Example B-5, except that the reaction conditions were varied. The treatment with the use of the dichloromethane/methanol mixture was not conducted.

The degrees of acetylation, the degrees of polymerization and the results of the analyses of the constituent saccharides of the cellulose diacetate thus obtained are given in Table B-2.

TABLE B-2

|  |  | Ex. | | | Comp. Ex. | | |
| --- | --- | --- | --- | --- | --- | --- | --- |
|  |  | B-7 | B-8 | B-9 | B-6 | B-7 | B-8 |
| Deg. of acetylation (%) |  | 56.30 | 56.50 | 56.69 | 56.69 | 55.80 | 54.98 |
| Deg. of polymn. |  | 188.0 | 179.4 | 186.9 | 186.9 | 177.0 | 178.8 |
| Const. saccharides | Xyl | 0.9 | 0.9 | 1.3 | 1.3 | 1.3 | 0.9 |
| of cellulose diacetate | Man | 3.7 | 4.7 | 5.0 | 5.0 | 3.3 | 2.6 |
| (mol %) | Glc | 95.4 | 94.5 | 93.8 | 93.8 | 95.4 | 96.5 |
| KW |  | 82 | 107 | 115 | 598 | 985 | 472 |
| Amt. of sediment at 50K (%) |  | 1.50 | 1.92 | 2.40 | 2.40 | 2.13 | 1.23 |
| Const. saccharides | Xyl | 4.5 | 4.6 | 5.7 | 3.7 | 4.0 | 5.6 |
| of sediment at 50K | Man | 12.0 | 13.0 | 17.9 | 16.5 | 17.5 | 10.2 |
| (mol %) | Glc | 83.5 | 82.4 | 76.4 | 79.8 | 78.5 | 84.2 |

Examples B-10 to B-12

A flaky cellulose diacetate was prepared from a soft wood sulfite dissolving pulp (α-cellulose content: 87.5%) through acetylation and aging in a similar manner to that of Example B-5 and dissolved in a dichloromethane/methanol (9:1, by weight) mixture in a concentration of 2%. Then, the obtained solution was concentrated and evaporated to dryness in a vacuum to give a solvent-treated sample.

From the same starting pulp, cellulose diacetates having the degree of acetylation and the degree of polymerization which will be described in the column of Example 11 or 12 in Table B-3 were obtained.

The degrees of acetylation, the degrees of polymerization, the results of the analyses of the constituent saccharides and so on of the cellulose diacetates obtained are given in Table B-3.

The measurement of the total volume of insolubles was conducted according to the method (iv) described above, and specially as follows: The cellulose diacetate obtained is dissolved in an electrolytic solution comprising 4.9% of ammonium thiocyanate, 4.7% of water and 89.4% of acetone in a concentration of 1%. Then, the insolubles contained in 2 ml of the solution were analyzed for particle size distribution by the use of a Coulter® multisizer, type II (mfd. by Coulter Electronics) to calculate the total volume of insolubles having a particle size ranging from 5.04 to 64.0 μm. As the result, with respect to each of the cellulose diacetates obtained in Examples 10 to 12, the total volume of insolubles having a particle size ranging from 5.04 to 64.0 μm contained in 2 ml of each solution was $5 \times 10^{-6}$ cm$^3$ or below. Thus, the cellulose diacetates are those containing an extremely small amount of insolubles.

Comparative Examples B-9 to B-11

Various cellulose diacetates were prepared from a soft wood sulfite dissolving pulp (α-cellulose content: 87.5%) through acetylation and aging in a similar manner to that of Example B-5, except that the reaction conditions were varied. The treatment with the use of the dichloromethane/methanol mixture was not conducted.

The degrees of acetylation, the degrees of polymerization, the results of the analyses of the constituent saccharides and so on of the cellulose diacetates obtained are given in Table B-3.

With respect to each of the cellulose diacetates obtained in Comparative Examples B-9 to B-11, the total volume of insolubles having a particle size ranging from 5.04 to 64.0 μm contained in 2 ml of each solution was $14 \times 10^{-6}$ cm$^3$ or above. Thus, an extremely large amount of insolubles were contained in the solution.

TABLE B-3

|  |  | Ex. | | | Comp. Ex. | | |
| --- | --- | --- | --- | --- | --- | --- | --- |
|  |  | B-10 | B-11 | B-12 | B-9 | B-10 | B-11 |
| Deg. of acetylation (%) |  | 56.50 | 56.30 | 56.69 | 56.50 | 56.20 | 54.98 |
| Deg. of polymn. |  | 179.4 | 188.0 | 186.9 | 188.0 | 168.0 | 178.8 |
| Const. saccharides of cellulose diacetate (mol %) | Xyl | 0.9 | 0.9 | 1.3 | 0.9 | 1.2 | 0.9 |
|  | Man | 4.7 | 3.7 | 5.0 | 3.7 | 3.0 | 2.6 |
|  | Glc | 94.5 | 95.4 | 93.8 | 95.4 | 95.8 | 96.5 |
| Vol. of insolubles ($10^{-6}$ cm$^3$/2 ml) |  | 4.192 | 3.868 | 4.078 | 18.339 | 22.375 | 14.447 |
| Amt. of sediment at 50K (%) |  | 1.92 | 1.50 | 2.20 | 1.30 | 2.03 | 1.23 |
| Const. saccharides of sediment at 50K (mol %) | Xyl | 4.6 | 4.5 | 5.7 | 5.3 | 3.8 | 5.6 |
|  | Man | 13.0 | 12.0 | 17.9 | 10.4 | 17.0 | 10.2 |
|  | Glc | 82.4 | 83.5 | 76.4 | 84.3 | 79.2 | 84.2 |

Examples B-13 to B-15

A flaky cellulose diacetate was prepared from a soft wood sulfite dissolving pulp (α-cellulose content: 87.5%) through acetylation and aging in a similar manner to that of Example B-5 and dissolved in a dichloromethane/methanol (9:1, by weight) mixture in a concentration of 2%. Then, the obtained solution was concentrated and evaporated to dryness in a vacuum to give a solvent-treated sample.

From the same starting pulp, cellulose diacetates having the degree of acetylation and the degree of polymerization which will be described in the column of Example 14 or 15 in Table B-4 were obtained.

The degrees of acetylation, the degrees of polymerization, the results of the analyses of the constituent saccharides and so on of the cellulose diacetates obtained are give n in Table B-4. Each of the cellulose diacetates prepared in these Examples had excellent haze values of 20 or below and excellent transparency.

Comparative Examples B-12 to B-14

Various cellulose diacetates were prepared from a soft wood sulfite dissolving pulp (α-cellulose content: 87.5%) through acetylation and aging in a similar manner to that of Example B-5. The treatment with the use of the dichloromethane/methanol mixture was not conducted.

The degrees of acetylation, the degrees of polymerization, the results of the analyses of the constituent saccharides and so on of the cellulose diacetates obtained are given in Table B-4. The cellulose diacetates obtained in these Comparative Examples had haze values as high as 27.1 to 41.4.

TABLE B-4

|  | Ex. | | | Comp. Ex. | | |
| --- | --- | --- | --- | --- | --- | --- |
|  | B-13 | B-14 | B-15 | B-12 | B-13 | B-14 |
| Deg. of acetylation (%) | 54.98 | 56.50 | 56.19 | 56.69 | 55.80 | 54.98 |
| Deg. of polymn. | 178.8 | 179.4 | 193.4 | 186.9 | 177.0 | 178.8 |

TABLE B-4-continued

|  |  | Ex. | | | Comp. Ex. | | |
| --- | --- | --- | --- | --- | --- | --- | --- |
|  |  | B-13 | B-14 | B-15 | B-12 | B-13 | B-14 |
| Const. saccharides | Xyl | 0.9 | 1.3 | 0.9 | 1.3 | 1.3 | 0.9 |
| of cellulose diacetate | Man | 3.7 | 5.0 | 3.7 | 5.0 | 3.3 | 2.6 |
| (mol %) | Glc | 95.4 | 93.8 | 95.4 | 93.8 | 95.4 | 96.5 |
| Haze |  | 18.6 | 18.4 | 19.2 | 37.5 | 41.4 | 27.1 |
| Amt. of sediment at 50K (%) |  | 1.10 | 2.20 | 1.67 | 2.40 | 2.13 | 1.23 |
| Const. saccharides | Xyl | 4.5 | 5.7 | 2.1 | 3.7 | 4.0 | 5.6 |
| of sediment at 50K | Man | 11.1 | 17.9 | 10.1 | 16.5 | 17.5 | 10.2 |
| (mol %) | Glc | 84.4 | 76.4 | 87.9 | 79.8 | 78.5 | 84.2 |

Example B-16

A flaky cellulose diacetate was prepared from a soft wood sulfite dissolving pulp (α-cellulose content: 87.5%) through acetylation and aging in a similar manner to that of Example B-5 and dissolved in a dichloromethane/methanol (9:1, by weight) mixture in a concentration of 2%. Then, the obtained solution was concentrated and evaporated to dryness in a vacuum to give a solvent-treated sample. The degree of acetylation, the degree of polymerization, the results of the analysis of the constituent saccharides and so on of the cellulose diacetate obtained are given in Table B-5.

With respect to the cellulose diacetate obtained in this Example, the mannose content in the sediment at 50K accounted for 11.1% of the total molar fraction of xylose, mannose and glucose therein, and the mannose content in the sediment at 8K accounted for 2.3% of the total molar fraction of xylose, mannose and glucose therein. This indicates that in the cellulose diacetate of the present invention, glucomannan acetate is contained in particles each having a relatively small particle size constituting the insolubles. Namely, it is suggested that the particle size of the glucomannan acetate constituting the insolubles is extremely small in the cellulose diacetate of the present invention.

Comparative Examples B-15 and B-16

Various cellulose diacetates were prepared from a soft wood sulfite dissolving pulp (α-cellulose content: 87.5%) through acetylation and aging in a similar manner to that of Example B-5, except that the reaction conditions were varied. The treatment with the use of the dichloromethane/methanol mixture was not conducted.

The degrees of acetylation, the degrees of polymerization, the results of the analyses of the constituent saccharides and so on of the cellulose diacetates obtained are given in Table B-5.

In each of the cellulose diacetates obtained in these Comparative Examples, the mannose content in the sediment at 8K is more than that of in Example B-16. Thus, it is clear that the particles of the glucomannan acetate constituting the insolubles in each of the cellulose diacetates obtained in these Comparative Examples are larger than those of the cellulose diacetate obtained in the Example B-16.

TABLE B-5

|  |  | Ex. | Comp. Ex. | |
| --- | --- | --- | --- | --- |
|  |  | B-16 | B-15 | B-16 |
| Deg. of acetylation (%) |  | 54.98 | 56.69 | 54.98 |
| Deg. of polymn. |  | 178.8 | 186.9 | 178.8 |
| Const. saccharides | Xyl | 0.9 | 1.3 | 0.9 |
| of cellulose | Man | 2.6 | 5.0 | 2.06 |
| diacetate (mol %) | Glc | 96.5 | 93.8 | 96.05 |
| Amt. of sediment at 8K (%) |  | 0.16 | 0.29 | 0.37 |
| Const. saccharides | Xyl | 26.5 | 30.3 | 18.5 |
| of sediment at 8K | Man | 2.3 | 15.8 | 7.8 |
| (mol %) | Glc | 71.2 | 53.9 | 73.7 |
| Amt. of sediment at 50K (%) |  | 1.23 | 2.40 | 1.23 |
| Const. saccharides | Xyl | 4.5 | 3.7 | 5.6 |
| of sediment at 50K | Man | 11.1 | 16.5 | 10.2 |
| (mol %) | Glc | 84.4 | 79.8 | 84.2 |

Examples B-17 to B-19

A soft wood sulfite dissolving pulp (α-cellulose content: 87.5%) was disintegrated in water and, after the replacement of the water with acetone, dried to give a fluffy pulp. The water content of the fluffy pulp was adjusted to 5.0%. 500 parts of acetic acid was uniformly sprayed on 100 parts of the resulting fluffy pulp, followed by mixing at 60° C. for 2 hours to effect a pretreatment and activation. The pretreated and activated pulp was thrown into a mixture comprising 250 parts of acetic anhydride, 375 parts of acetic acid and 4 parts of sulfuric acid which had been prepared in a kneader acetylator and cooled to 12° C., followed by agitation. The contents of the kneader acetylator underwent heat buildup due to the reaction of acetic anhydride with water entrained by the pulp and that of acetic anhydride with cellulose. Therefore, the temperature of the contents was controlled by external cooling so as to rise from about 16° C. (initial) to 77° C. in 60 minutes, and then the contents were maintained at 77° C. for 12 minutes to conduct acetylation.

Then, 10 parts of a 20% aqueous solution of magnesium acetate was added to the reaction mixture, by which the sulfuric acid was neutralized and the system was brought to a state containing excessive magnesium acetate. The reaction mixture thus neutralized was transferred to an autoclave, steam at a gauge pressure of 5 kg/cm$^3$ was blown into the autoclave in a hermetically sealed state under stirring to raise the temperature of the contents to 150° C. in about 60 minutes. Then, the contents were maintained at 150° C. for 50 minutes and thereafter gradually flushed into the open air to lower the temperature of the reaction mixture to 100° C. A dilute aqueous solution of acetic acid was added to the reaction mixture under vigorous stirring to give flaky cellulose diacetate, which was recovered, thoroughly washed and dried.

The flaky cellulose diacetate prepared by the above process was dissolved in a dichloromethane/methanol (9:1, by weight) mixture in a concentration of 2%. Then, the obtained solution was concentrated and evaporated to dryness in a vacuum to give a solvent-treated sample.

From the same starting pulp, cellulose diacetates having the degrees of acetylation and the degrees of polymerization which will be described in the column of Example 18 or 19 in Table B-6 were obtained.

The degrees of acetylation, the degrees of polymerization, the results of the analyses of the constituent saccharides, the amounts of sediment at 8K and the results of their analyses of the constituent saccharides, the amount of sediment at 50K and the results of their analyses of the constituent saccharides, the KW values, the volumes of insolubles and the haze values of the cellulose diacetates obtained are given in Table B-6.

TABLE B-6

|  |  | Ex. | | |
| --- | --- | --- | --- | --- |
|  |  | B-17 | B-18 | B-19 |
| Deg. of acetylation (%) |  | 54.98 | 56.30 | 56.50 |
| Deg. of polymn. |  | 178.8 | 188.0 | 179.4 |
| Const. saccharides | Xyl | 0.8 | 0.9 | 0.9 |
| of cellulose | Man | 2.5 | 3.7 | 4.7 |
| diacetate (mol %) | Glc | 96.7 | 95.4 | 94.5 |
| Amt. of sediment at 8K (%) |  | 0.16 | 0.15 | 0.16 |
| Const. saccharides | Xyl | 26.5 | 28.2 | 27.8 |
| of sediment at 8K | Man | 2.3 | 3.0 | 2.9 |
| (mol %) | Glc | 71.2 | 68.8 | 69.3 |
| Amt. of sediment at 50K (%) |  | 1.10 | 1.50 | 1.92 |
| Const. saccharides | Xyl | 4.5 | 4.5 | 4.6 |
| of sediment at 50K | Man | 11.1 | 12.0 | 13.0 |
| (mol %) | Glc | 84.5 | 83.5 | 82.4 |
| Amt. of sediment at 8K/Amt. of sediment at 50K (%) |  | 14.5 | 10.0 | 9.4 |
| KW |  | 109 | 82 | 107 |
| Volume of insolubles ($10^{-6}$ cm$^3$/2 ml) |  | 3.987 | 3.868 | 4.192 |
| Haze |  | 18.6 | 18.4 | 19.5 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. A process for preparing cellulose diacetate comprising the steps of: disintegrating a raw pulp having an α-cellulose content of about 85 to 93%; mixing the disintegrated raw pulp with acetic acid to form a pretreated pulp; mixing the pretreated pulp with acetic anhydride, acetic acid and an acidic catalyst to form cellulose triacetate; hydrolyzing the cellulose triacetate to form cellulose diacetate; recovering the cellulose diacetate; dissolving the cellulose diacetate in a hemicellulose acetate-dissolving organic solvent; and evaporating the solvent to form a product cellulose diacetate containing a hemicellulose acetate fraction, the hemicellulose fraction in the product cellulose diacetate being from about 3.3 to about 6.3 mole % as xylose and mannose based on the total of xylose, mannose and glucose in the product cellulose diacetate.

2. The process of claim 1, wherein said solvent comprises a chlorinated hydrocarbon.

3. The process of claim 1, wherein the dissolved cellulose diacetate is contained in the solvent in a concentration of 2 wt. %.

4. The process of claim 1, wherein the organic solvent is added in an amount of at least 10 wt. % based on the amount of diluent.

5. The process of claim 4, wherein the organic solvent is added in an amount of from 10 to 90 wt. %.

6. The process of claim 5, wherein the organic solvent is added in an amount of from 30 to 70 wt. %.

7. The process of claim 1, wherein said solvent is selected from the group consisting of a halogenated hydrocarbon, a nitro group-containing compound, ethyl cellosolve acetate and cyclohexanone.

8. The process of claim 7, wherein said solvent is a halogenated hydrocarbon or a nitro group-containing compound.

9. The process of claim 8, wherein said solvent is a nitro group-containing compound.

10. A process for preparing a fatty acid ester of cellulose comprising the steps of: disintegrating a raw pulp having an α-cellulose content of about 85 to 93%; mixing the disintegrated raw pulp with the fatty acid to form a pretreated pulp; mixing the pretreated pulp with an anhydride of the fatty acid, the fatty acid and an acidic catalyst to form a cellulose ester; hydrolyzing the cellulose ester to form a desired cellulose fatty acid ester; recovering the desired cellulose fatty acid ester; dissolving the recovered cellulose fatty acid ester in a hemicellulose fatty acid ester-dissolving organic solvent; and evaporating the solvent to form a product cellulose fatty acid ester containing a hemicellulose fatty acid ester fraction, the hemicellulose fraction in the product cellulose fatty acid ester being from about 3.3 to about 6.3 mole % as xylose and mannose based on the total of xylose, mannose and glucose in the product cellulose fatty acid ester.

11. The process of claim 10, wherein said solvent is selected from the group consisting of a halogenated hydrocarbon, a nitro group-containing compound, ethyl cellosolve acetate and cyclohexanone.

12. The process of claim 11, wherein said solvent is a halogenated hydrocarbon or a nitro group-containing compound.

13. The process of claim 12, wherein said solvent is a nitro group-containing compound.

14. The process of claim 10, wherein said organic solvent comprises a halogenated hydrocarbon.

15. The process of claim 10, wherein the dissolved fatty acid ester is contained in the solvent in a concentration of 2 wt. %.

16. The process of claim 10, wherein the organic solvent is added in an amount of at least 10 wt. % based on the amount of diluent.

17. The process of claim 16, wherein the organic solvent is added in an amount of from 10 to 90 wt. %.

18. The process of claim 17, wherein the organic solvent is added in an amount of from 30 to 70 wt. %.

19. The process of claim 10, wherein said solvent is selected from the group consisting of a halogenated hydrocarbon, a nitro group-containing compound, ethyl cellosolve acetate and cyclohexanone.

20. The process of claim 19, wherein said solvent is a halogenated hydrocarbon or a nitro group-containing compound.

21. The process of claim 20, wherein said solvent is a nitro group-containing compound.

* * * * *